United States Patent [19]
Clarke et al.

[11] Patent Number: 5,503,258
[45] Date of Patent: Apr. 2, 1996

[54] HYDRAULIC SHOCK ABSORBER

[75] Inventors: William H. Clarke, Farmington Hills; Ray A. Sackett, Monroe; Matthias Raulf, Rochester Hills; Rolf Wengenroth, Harrison Township, all of Mich.

[73] Assignees: Ford Motor Co.; Sachs Automotive of America

[21] Appl. No.: 291,276

[22] Filed: Aug. 16, 1994

[51] Int. Cl.⁶ .................. F16F 9/19; F16F 9/346
[52] U.S. Cl. .................... 188/282; 188/286
[58] Field of Search ................. 188/266, 281, 188/282, 284–286, 287, 297, 299, 311, 313, 315, 317, 318, 322.19; 280/707

[56] References Cited

U.S. PATENT DOCUMENTS

| | | | |
|---|---|---|---|
| 2,360,755 | 10/1944 | Boor | 188/286 |
| 2,527,034 | 10/1950 | Rossman | 188/287 |
| 2,783,859 | 3/1957 | Patriquin | 188/287 |
| 3,213,973 | 10/1965 | Damon | 188/287 |
| 3,584,712 | 6/1971 | Dickinson | 188/282 |
| 3,918,693 | 11/1975 | Zahid | 188/287 |
| 4,298,101 | 11/1981 | Dressell, Jr. et al. | 188/285 |
| 4,591,031 | 5/1986 | Kirst | 188/287 |
| 4,650,042 | 3/1987 | Knecht et al. | 188/299 |
| 4,802,561 | 2/1989 | Knecht et al. | 188/299 X |
| 5,163,538 | 11/1992 | Derr et al. | 188/318 |
| 5,392,885 | 2/1995 | Patzenhauer et al. | 188/299 |

FOREIGN PATENT DOCUMENTS

| | | | |
|---|---|---|---|
| 4027796 | 3/1992 | Germany | 188/318 |
| 2234041 | 1/1991 | United Kingdom | 188/318 |

*Primary Examiner*—Robert J. Oberleitner
*Assistant Examiner*—Alfred Muratori

[57] ABSTRACT

A hydraulic shock absorber having discrete damping levels in the rebound direction includes a piston that reciprocates within a pressure tube and divides the pressure tube into rebound and pressure chambers. A passage extends through the piston for establishing fluid communication between the rebound and pressure chambers. A one-way, pressure responsive valve normally closing the passage opens in response to fluid pressure of a predetermined magnitude in the rebound chamber when the piston moves in the rebound direction. The side wall of the pressure tube has bleed holes that lead to a bypass channel that is controlled by an electronically controlled or actuated solenoid valve that opens and closes the outlet of the bypass channel to change the damping characteristics in the rebound and jounce directions in response to suspension conditions. The piston carries a slide valve that closes the bleed holes to the bypass channel mechanically in the rebound direction in response to rapid changes in suspension conditions that the solenoid valve cannot react to quick enough.

8 Claims, 2 Drawing Sheets

HYDRAULIC SHOCK ABSORBER

BACKGROUND OF THE INVENTION

This invention relates generally to hydraulic shock absorbers and more particularly to hydraulic shock absorbers that dissipate the kinetic energy of an automotive suspension system.

Conventional hydraulic shock absorbers work in a damping range which is a compromise between suspension control and ride comfort. In the past this compromise has been addressed by adjusting damping levels in various ways.

For example, in a known semi-active suspension system, the hydraulic shock absorber has a by-pass channel between the upper or rebound chamber of the pressure tube and the reservoir of the shock absorber that is controlled by a solenoid valve that is computer actuated in response to suspension conditions to provide two discrete damping levels. When open the solenoid valve allows hydraulic fluid escaping the rebound chamber to bypass the piston valve assembly so that the shock absorber provides a low damping force or soft mode of operation. However, when the solenoid valve is closed, the escaping hydraulic fluid cannot bypass the piston valve assembly so that the shock absorber provides a high damping force or firm mode of operation in the rebound direction. See for instance, the shock absorber that is shown and described in connection with FIGS. 41–43 of U.S. Pat. No. 4,650,042 granted to Heinz Knecht et al Mar. 17, 1987 for an adjustable hydraulic shock absorber.

Adjustable hydraulic shock absorbers, such as those exemplified by the Knecht et al patent, provide satisfactory operation under many conditions. However, certain events, such as a vehicle driving off a curb or squared edge, are too fast for these computer controlled shock absorbers to sense and react to in time to dissipate the excessive suspension energy.

SUMMARY OF THE INVENTION

The object of this invention is to provide an adjustable hydraulic shock absorber for a semi-active suspension system that changes to the firm mode of operation even under very rapid changes in suspension conditions such as a vehicle driving off a curb or squared edge.

Briefly, the adjustable hydraulic shock absorber of this invention accommodates abrupt or rapid changes in suspension conditions by incorporating an override mechanism that reacts mechanically to those events that occur too fast for the semi-active suspension system noted above to sense and actuate a solenoid valve in time to dissipate excessive suspension energy effectively.

A feature of the invention is that the adjustable hydraulic shock absorber of this invention is equipped with a mechanical override in the form of a valve that closes off the bypass channel in response to a predetermined position of the shock absorber piston so that the shock absorber changes to a firm mode of operation regardless of the speed of the suspension events requiring the mode change in the shock absorber.

Another feature of the invention is that the adjustable hydraulic shock absorber of the invention is equipped with a mechanical override in the form of a slide valve that moves with the shock absorber piston to close off the by-pass channel in response to a predetermined position of the shock absorber piston so that the shock absorber changes to a firm mode of operation even if the solenoid valve cannot close quickly enough in response to those events that require a firm mode of operation.

Yet another feature of the invention is that the adjustable hydraulic shock absorber of the invention is equipped with a mechanical override that is easily tuned to provide a precisely timed response to conditions that require a high level of damping.

Yet another feature of the invention is that the adjustable hydraulic shock absorber of the invention is equipped with a mechanical override that is very versatile in providing the necessary response to conditions that require a high level of damping.

Still yet another feature of the invention is that the adjustable hydraulic shock absorber of the invention is equipped with a mechanical override that accommodates bending of a long narrow construction such as might be found in an hydraulic strut.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
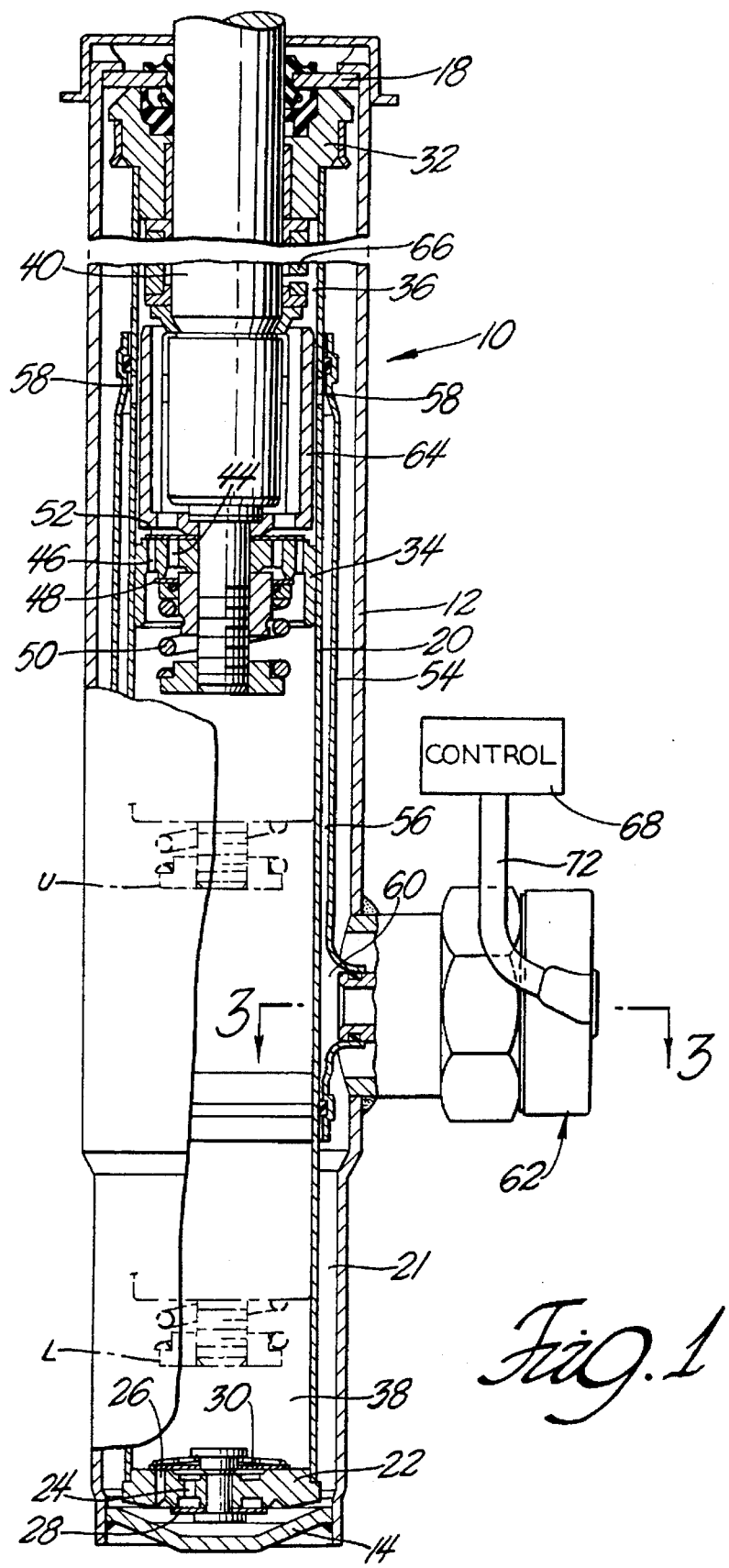
FIG. 1 is a longitudinal sectional view of an adjustable hydraulic shock absorber of the invention.
Figure 2:
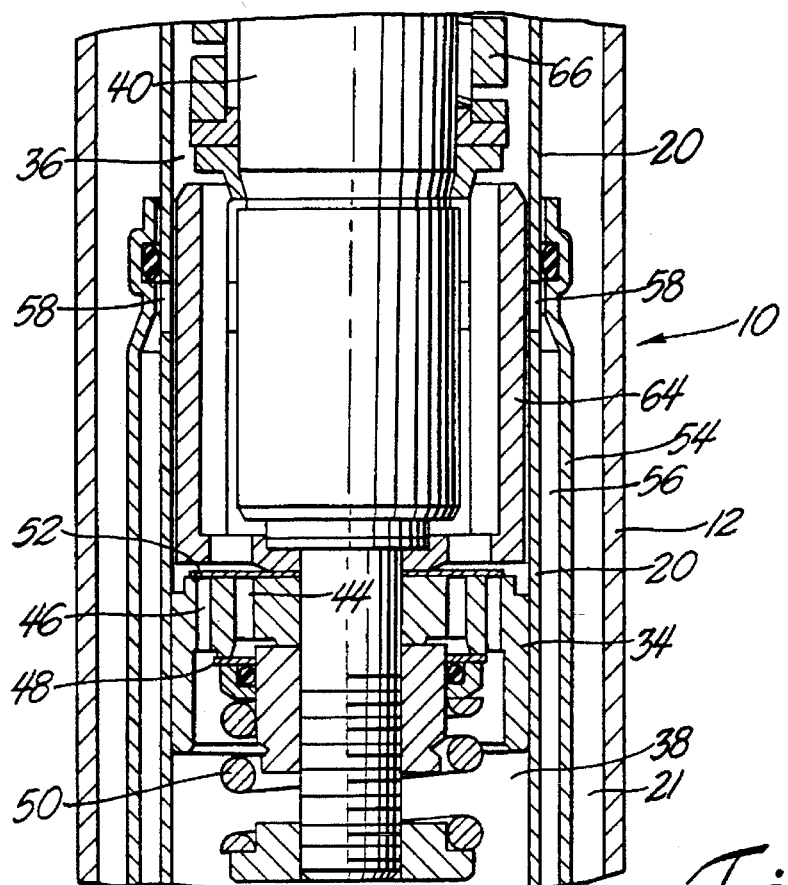
FIG. 2 is an enlargement of a portion of FIG. 1.

Referring now to the drawing, a vehicle suspension strut includes an adjustable hydraulic shock absorber of the invention that is indicated generally at 10. The shock absorber 10 has an outer tube or housing 12 that is closed at its lower end by an end plate 14. A mounting bracket (not shown) is welded onto the housing 12 near its lower end for fastening the shock absorber to the unsprung mass of a vehicle in well known manner. The upper end of the housing 12 is closed by an annular seal plate assembly 18.

A pressure tube 20 is concentrically arranged within the housing 12 to define a reservoir 21 between the pressure tube 20 and the housing 12. The pressure tube 20 is closed at its lower end by a valve plate assembly 22 that has inner and outer ports 24 and 26. The inner ports 24 are closed by a firm lower spring disk 28 while the outer ports 26 are closed by a lighter upper spring disk 30. The spring disks 28 and 30 are retained by a rivet-like fastener that rests on the lower end plate 14 and spaces the valve plate assembly 22 from the lower end plate. The valve plate assembly 22 operates in a well known manner to transfer hydraulic fluid back and forth between the pressure tube 20 and the reservoir 21 during operation of the hydraulic shock absorber 10.

The upper end of the pressure tube 20 is mounted on a rod guide 32 that is seated in the housing 12 below the seal plate 18. A piston 34 reciprocates within the pressure tube 20 which is filled with hydraulic fluid and divides the pressure tube 20 into an upper rebound chamber 36 and a lower compression chamber 38. The piston 34 is attached to the end of a rod 40 that extends through the rod guide 32 and the seal plate assembly 18. The upper end of the rod 40 has a fitting (not shown) for attaching the shock absorber 10 to the sprung mass of the vehicle in well known manner.

The piston 34 has inner and outer ports 44 and 46 that form piston valves that operate in well know manner to transfer hydraulic fluid back and forth between the rebound chamber 36 and the compression chamber 38 during operation. Briefly, the inner ports 44 are closed by a lower washer 48 that is held against the lower face of the piston 34 by a strong coil spring 50 to provide a firm piston valve that provides a firm mode of operation in the rebound direction as further explained below. The outer ports 46 are closed by a lighter spring disk 52.

Figure 3:
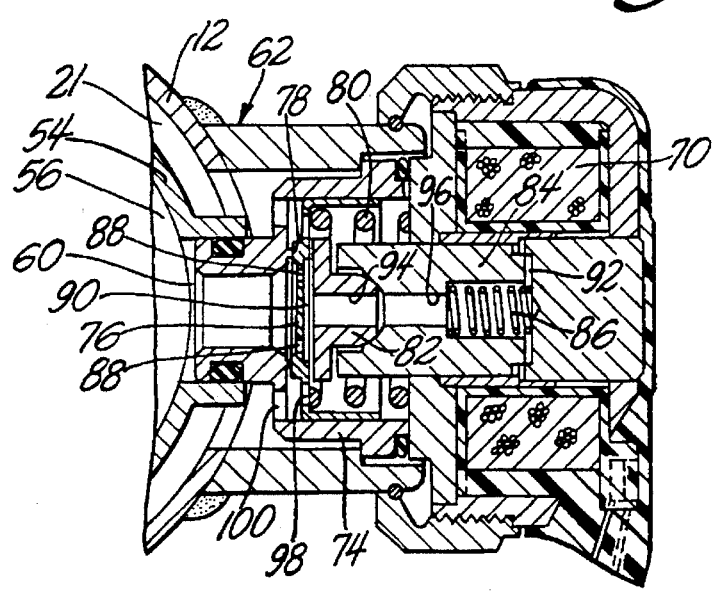
FIG. 3 is a section taken substantially along the line 3—3 of FIG. 1 looking in the direction of the arrows.

The shock absorber 10 includes an intermediate tube 54 that is mounted on the medial portion of the pressure tube 20. The intermediate tube 54 is sealed at the upper and lower ends to form a bypass channel 56 that communicates with the interior of the pressure tube 20 via a plurality of circumferentially spaced bleed holes 58 that extend through the pressure tube 20 at the upper end of the intermediate tube 54. The bleed holes 58 are sized and located as explained below. The intermediate tube 54 has an outlet 60 for the bypass channel 56 that communicates with the reservoir 21. The outlet 60 is opened and closed by a solenoid valve assembly 62 as best shown in FIGS. 1 and 3.

Focusing on FIG. 1, the bleed holes 58 at the inlet of the by-pass channel 56 are open and closed by a slide valve 64 in the form of a cup that is disposed in the rebound chamber 36 and attached to the piston rod 40 ahead of the piston 34. The bottom of the cup has ports so that slide valve 64 does not obstruct the flow of hydraulic fluid into or out of the rebound chamber 36 via the piston valves.

The shock absorber 10 also includes a coil spring 66 that surrounds the piston rod 40 in the pressure tube 20. The lower end of the coil spring 66 engages a stop attached to the piston rod 40 above the slide valve 60 and the upper end of the coil spring 66 engages the rod guide 32.

The solenoid valve 62 is actuated by an electronic control 68 that receives input signals from vehicle components that can be used to determine the suspension motion of the vehicle wheel relative to the vehicle body. The control 68 operates on these signals according to a programmable computer within the control 68 and generates a command that is transmitted to coil 70 via conductor 72 to open or close the solenoid valve 62 in response to various suspension conditions.

The solenoid valve 62 is a well known type comprising a valve body 74 that is inserted into the outlet 60 and a moveable valve disk 76 that is biased against a valve seat 78 of the valve body 74 by a compression coil spring 80. The solenoid valve 62 further comprises a valve cap 82, an armature 84 and an armature spring 86 that bias the armature 84 and valve cap 82 against valve disk 76.

The valve cap 82 and armature 84 are hydraulically balanced via a plurality of throttle bores 88 in the valve disk 76 that communicate with a control chamber 90 above the valve disk 76 that in turn communicates with a space 92 above the armature 84 via concentric bores 94 and 96 of the valve cap 82 and armature 84.

When the coil 70 is deenergized as shown in FIG. 3, the flow of hydraulic fluid out of the by-pass outlet 60 is substantially blocked off by the valve cap 82. However, a small portion of the hydraulic fluid does flow through the throttle bores 88 into the control chamber 90 to equalize the pressure on the valve cap 82 and thence into the space 92 via the concentric bores 94 and 96 to equalize the pressure on the armature 84. Consequently, the valve disk 76, the valve cap 82 and the armature 84 are firmly held in their respective seated positions shown in FIG. 3 by the compression coil spring 80 and the armature spring 86 regardless of the pressure of the hydraulic fluid in the bypass channel 56 and outlet 60.

When the coil 70 is energized, the armature 84 is retracted against the action of the armature spring 86 and the valve cap 82 is moved away from the valve disk 76 by the hydraulic pressure in the control chamber 90. The hydraulic fluid in the control chamber 90 then flows out of the control chamber 90 between the valve cap 82 and the valve disk 76 and into the reservoir 21 via the respective outer outlet passages 98 and 100 of the valve disk 76 and the valve body 74. This collapses the pressure of the hydraulic fluid in the control chamber 90 so that the valve disk 76 is moved away from the valve seat 78 to the open position by the hydraulic pressure in the bypass channel 56 and outlet 60. This allows hydraulic fluid in the rebound chamber 36 to flow to the reservoir 21 via bleed holes 58, by-pass channel 56, outlet 60, and outlet passages 100.

During normal operation, the solenoid valve 62 adjusts the operation of the hydraulic shock absorber 10 by shifting the damping level back and forth between a low damping level or soft mode of operation and a high damping level or firm mode of operation. More particularly the solenoid 70 is energized to retract the armature 84 which opens the solenoid valve 62 and provides a low damping level or soft mode of operation. With the solenoid valve 62 open, the hydraulic fluid that is displaced from the rebound chamber 36 as the piston 34 moves upwardly in pressure tube 20 during rebound flows through the bleed holes 58 into the bypass channel 56 and thence out the outlet 60 and into the reservoir 21 via the open solenoid valve 62. The bleed holes 58 are sized to provide a soft damping effect as the piston 34 rebounds and the displaced hydraulic fluid from the rebound chamber 36 flows through the by-pass channel 56 by virtue of the open solenoid valve 62. However when suspension conditions that are sensed by the electronic control 68 require firm or high level rebound damping, the solenoid 70 is deenergized and the solenoid valve 62 is closed by the compression coil spring 80 and the armature spring 86. When the solenoid valve 62 is closed, the hydraulic fluid in the rebound chamber 36 cannot flow through the bypass channel 56 as the piston 34 rises in the pressure tube 20. Consequently hydraulic pressure builds in the rebound chamber 36 until the force is sufficient to open the piston valve against the action of the coil spring 50. This provides a high damping level or firm mode of operation in the rebound direction.

During normal operation the piston 34 reciprocates between a low position shown in phantom at L in FIG. 1 and an upper position shown in phantom at U in FIG. 1. The bleed holes 58 are specifically positioned so that the bleed holes 58 are not blocked by slide valve 64 under normal operating conditions, that is, those conditions that the electronic control 68 and solenoid valve 62 can sense and react to in a timely fashion. Thus under normal operating conditions the damping level of the adjustable hydraulic shock absorber 10 is controlled solely by the solenoid valve 62 and the electronic control 68.

However, as indicated above, the electronic control 68 and solenoid valve 62 do not sense and react quickly enough to some suspension conditions that require the high damping level and firm mode of operation in the rebound direction such as a vehicle driving off a curb. In such circumstances, the slide valve 64 overrides the electronic control 68 and solenoid valve 62 by closing the bleed holes 58 when the piston 34 reaches a predetermined position such as the fully extended position shown in solid line in FIG. 1 which is above the extension of the shock absorber 10 during normal operation. This piston position changes the shock absorber 10 from the soft mode of operation to the firm mode of operation mechanically. Thus under extraordinary conditions, the damping level of the hydraulic shock absorber 10 is controlled by the piston 34 and slide valve 64 independently of the solenoid valve 62.

The point at which the bleed holes 58 are blocked to provide the mechanical override is preferably selected so as to avoid metal-to-metal contact at the top of the piston stroke such as would occur when the rebound coil spring 66 bottoms out. This override point can be adjusted and fine tuned by the selecting the length of the slide valve 64 and/or the placement of the bleed holes 58. Moreover the use of a separate slide valve 64 makes it possible to activate the mechanical override at different piston positions simply by changing the length of the slide valve 64. Thus the override characteristics are altered easily to meet the requirements of various suspension applications.

Another feature of the slide valve 64 is that it is sized so that there is a gap 76 between the outer surface of the slide valve 64 and the bore of the pressure tube 20. This gap 76 accommodates a slight bending of the shock absorber 10 during use which is particularly advantageous in a long narrow construction such as a hydraulic strut.

Still another feature of the slide valve override arrangement is that the transition between the low level damping of the open bleed holes 58 and the high level damping of the blocked bleed holes 58 can be altered in several ways. These include adjusting the size of gap 70 and/or the bleed holes 58 and using a series of bleed holes of the same or different sizes along the pressure tube 20 that are closed sequentially as the piston 34 rebounds. Thus the slide valve arrangement of the invention is also very versatile.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An adjustable hydraulic shock absorber having a controlled rebound and jounce comprising:

a pressure tube adapted to contain a hydraulic fluid, a piston reciprocable within the pressure tube and dividing the pressure tube into first and second chambers, a passage extending through the piston for establishing fluid communication between the first and second chambers, a one-way, pressure responsive valve normally closing the passage, the one-way valve opening in response to fluid pressure created in the first chamber when the piston moves in one direction, a bypass channel in communication with the first chamber via a bleed hole through the pressure tube, the bypass channel having an outlet that is controlled by an outlet valve that is opened to provide low level damping via the bleed hole and closed to provide high level damping via the passage through the piston, and an override mechanism that covers the bleed hole to provide high level damping via the passage through the piston independently of the outlet valve.

2. An adjustable hydraulic shock absorber having a controlled rebound and jounce comprising:

a pressure tube adapted to contain a hydraulic fluid, a piston reciprocable within the pressure tube and dividing the pressure tube into first and second chambers, a passage extending through the piston for establishing fluid communication between the first and second chambers, a one-way, pressure responsive valve normally closing the passage, the one-way valve opening in response to fluid pressure created in the first chamber when the piston moves in one direction, a bypass channel in communication with the first chamber via a bleed hole through the pressure tube, the bypass channel having an outlet that is controlled by an outlet valve that is opened to provide low level damping via the bleed hole and closed to provide high level damping via the passage through the piston, and an override mechanism for blocking the bleed hole to provide high level damping via the passage through the piston independently of the outlet valve including a slide valve that moves in unison with the piston and closes the bleed hole as the piston moves in the one direction.

3. The adjustable hydraulic shock absorber as defined in claim 2 wherein the slide valve includes a sleeve for blocking the bleed hole that is spaced from an internal wall of the pressure tube to accommodate a slight bending of the shock absorber during use.

4. The adjustable hydraulic shock absorber as defined in claim 2 wherein the slide valve is a cup shaped member that is attached to the piston.

5. An adjustable hydraulic shock absorber having a controlled rebound comprising:

a pressure tube adapted to contain a hydraulic fluid, a piston reciprocable within the pressure tube and dividing the pressure tube into rebound and compression chambers, a passage extending through the piston for establishing fluid communication between the rebound and compression chambers, a one-way, pressure responsive valve normally closing the passage, the one-way valve opening in response to fluid pressure created in the rebound chamber when the piston moves in the rebound direction, a bypass channel in communication with the rebound chamber via a bleed hole through a side wall of the pressure tube, the bypass channel having an outlet that is controlled by an outlet valve that is actuated in response to sensed conditions, the outlet valve being open to provide low level damping in the rebound direction via the bleed hole and closed to provide high level damping in the rebound direction via the passage through the piston, and an override mechanism for providing high level damping in the rebound direction via the passage through the piston independently of the outlet valve, the override mechanism comprising a slide valve for blocking the bleed hole responsive to the position of the piston.

6. An adjustable hydraulic shock absorber having a controlled rebound and jounce comprising:

a pressure tube adapted to contain a hydraulic fluid, a piston reciprocable within the pressure tube and dividing the pressure tube into rebound and compression chambers, a passage extending through the piston for establishing fluid communication between the rebound and compression chambers, a one-way, pressure responsive valve normally closing the passage, the one-way valve opening in response to fluid pressure created in the rebound chamber when the piston moves in the rebound direction, a bypass channel in communication with the rebound chamber via a plurality of circumferentially spaced bleed holes through a side wall of the pressure tube, the by-pass channel having an outlet that is controlled by a solenoid valve that is actuated by a computerized electronic control in response to sensed conditions, the solenoid valve being opened to provide low level damping in the rebound direction via the bleed holes and closed to provide high level damping in the rebound direction via the passage through the piston, and an override mechanism for providing high level damping in the rebound direction via the passage through the piston independently of the solenoid valve, the override mechanism comprising a slide valve that moves in unison with the piston and blocks the bleed holes when the piston moves to a predetermined position in the pressure tube.

7. The adjustable hydraulic shock absorber as defined in claim 6 wherein the slide valve includes a sleeve for blocking the bleed holes that is spaced from the side wall of the pressure tube to accommodate a slight bending of the shock absorber during use.

8. The adjustable hydraulic shock absorber as defined in claim 6 wherein the slide valve is a cup shaped member that is attached to the piston by a piston rod, the cup shaped member being shaped so that it does not obstruct flow out of the rebound chamber via the passage extending through the piston.

\* \* \* \* \*